(12) United States Patent
Hobdy et al.

(10) Patent No.: US 6,662,679 B2
(45) Date of Patent: Dec. 16, 2003

(54) REMOVABLE HANDLE AND TONGUE ASSEMBLY

(75) Inventors: Matthew Hobdy, Nashville, TN (US); James Childers, Christiana, TN (US); Dennis Simpson, Minnetonka, MN (US)

(73) Assignees: Tractor Supply Co., Nashville, TN (US); RMM Corporation, Eden Prairie, MN (US)

( * ) Notice: Subject to any disclaimer, the term of this patent is extended or adjusted under 35 U.S.C. 154(b) by 0 days.

(21) Appl. No.: 10/039,030

(22) Filed: Jan. 4, 2002

(65) Prior Publication Data

US 2002/0105164 A1 Aug. 8, 2002

Related U.S. Application Data

(60) Provisional application No. 60/302,934, filed on Jul. 3, 2001.

(51) Int. Cl.[7] .................................................. G05G 1/00
(52) U.S. Cl. .......................................................... 74/548
(58) Field of Search .......................... 74/523, 524, 543, 74/544, 546, 547, 548, 551.4; 403/150, 152, 153, 154, 156, 157, 159; 16/436, 449

(56) References Cited

U.S. PATENT DOCUMENTS

| | | | | |
|---|---|---|---|---|
| 2,210,292 A | * | 8/1940 | Hodgkin | 280/204 |
| 2,399,043 A | * | 4/1946 | Klumb | 280/85 |
| 2,760,790 A | * | 8/1956 | Andrews | 280/504 |
| 2,794,657 A | * | 6/1957 | Anderson | 280/477 |
| 3,091,967 A | * | 6/1963 | Hurdlow | 73/864.71 |
| 3,100,120 A | * | 8/1963 | Cleary | 280/87.01 |
| 3,130,443 A | * | 4/1964 | Tonelli | 16/110.1 |
| 4,037,853 A | * | 7/1977 | Sparks | 280/204 |
| 4,227,709 A | * | 10/1980 | Gradwohl et al. | 280/47.11 |
| 4,277,075 A | | 7/1981 | Shay | 280/47.36 |
| 4,645,224 A | | 2/1987 | Poganski | 280/47.17 |
| 4,953,886 A | * | 9/1990 | Grant | 280/47.11 |
| 5,180,179 A | | 1/1993 | Salvucci | 280/47.315 |
| 5,257,892 A | | 11/1993 | Branch | 414/490 |
| 5,319,829 A | * | 6/1994 | Manuel | 16/427 |
| 5,337,609 A | * | 8/1994 | Hsu | 280/278 |
| 5,529,323 A | | 6/1996 | vom Braucke et al. | 280/87.01 |
| 5,669,617 A | * | 9/1997 | Pasin et al. | 280/147 |
| 5,906,452 A | * | 5/1999 | Lee | 280/278 |
| 5,941,585 A | | 8/1999 | McAlister, II | 294/15 |
| 6,182,988 B1 | * | 2/2001 | Wu | 280/87.041 |
| 6,409,188 B1 | * | 6/2002 | Hesmer | 280/79.5 |
| 2002/0096857 A1 | * | 7/2002 | Valdez et al. | 280/293 |

* cited by examiner

*Primary Examiner*—Chong H. Kim
(74) *Attorney, Agent, or Firm*—Patterson, Thuente, Skaar & Christensen, P.A.

(57) ABSTRACT

The present invention addresses the need for a handle that is easily and removably attachable to the pin-connection hitch on the tongue of a towed vehicle allowing for manual movement and maneuvering of the towed vehicle. In the invention, a handle is provided that has a portion designed to be easily grippable with a human hand. The handle also has an attachment portion that is configured so as to be attachable with a pin to the pin-connection hitch on the tongue of the towed vehicle.

12 Claims, 7 Drawing Sheets

REMOVABLE HANDLE AND TONGUE ASSEMBLY

REFERENCE TO RELATED APPLICATION

This application claims the benefit under 35 U.S.C 119(e) of U.S. Provisional Application Ser. No. 60/302,934 filed on Jul. 3, 2001.

FIELD OF THE INVENTION

The present invention generally pertains to removable handle and tongue assembly. More specifically, the present invention pertains to a removable handle and tongue assembly for manually moving and positioning a towed vehicle such as a utility cart or trailer.

BACKGROUND OF THE INVENTION

It is common to attach a towed vehicle such as a trailer to a towing vehicle by use of a rigid member with an articulating connection at the points of attachment to the vehicles. Many methods are used for making the attachment. For example, heavy trailers are often connected with the pintle arrangement discussed in U.S. Pat. No. 5,941,585. Lighter trailers for highway use are often connected with a ball and hitch apparatus as shown U.S. Pat. No. 4,645,224.

For still lighter towed vehicles, however, the connection is often simpler. Light utility trailers for off-highway use, such as a trailer for a garden tractor for example, are often connected with a simple pin connection. For instance, the pin connection can take the form of a rigid tongue member connected at one end to the towed vehicle and having a hitch consisting of a clevis at the other end. The clevis has a hole or aperture through each branch of the clevis. The towing vehicle is provided with a projecting tab at its rear side also having a hole or aperture through it. When the clevis end of the tongue is mated with the tab projecting from the towing vehicle, the holes can be aligned and a pin inserted to couple the two vehicles together.

Tight maneuvering, especially backing, of a towed vehicle while connected to the towing vehicle is often difficult. Also, it is sometimes desirable to move a towed vehicle in places where the towing vehicle cannot go. Accordingly, it is sometimes necessary to manually pull and maneuver a towed vehicle. The apparatus used for connecting the tongue of the towed vehicle to the towing vehicle, however, is normally not conducive to gripping with the human hand. For that reason, various apparatus have been designed over time to provide detachable handles for use with a tongue of a towed vehicle.

For pintle towed trailers, the handle described in U.S. Pat. No. 5,941,585 attaches to the pintle ring, allowing two persons to lift the tongue and maneuver the trailer. This device, however, is suitable only for pintle type connections.

For lighter trailers using a ball and hitch, the handle of U.S. Pat. No. 4,645,224 can be attached to the tongue member, allowing one or two persons to lift and maneuver the trailer. The spring-loaded, twist-locking arrangement of this apparatus, however, requires the tongue member to have a somewhat large cross-section to accommodate the apparatus. Towed vehicles light enough to use a pin-connection type hitch generally do not use a tongue having a large cross section. Accordingly, such a handle is usually not suitable for use with a lighter towed vehicle.

What is needed is an easily detachable handle that can be used with the tongue of a towed vehicle, where the towed vehicle has a tongue with a pin-connection type hitch.

SUMMARY OF THE INVENTION

The present invention addresses the need for a handle that is easily and removably attachable to the pin-connection hitch on the tongue of a towed vehicle allowing for manual movement and maneuvering of the towed vehicle. In the invention, a handle is provided that has a portion designed to be easily grippable with a human hand. The handle also has an attachment portion that is configured so as to be attachable with a pin to the pin-connection hitch on the tongue of the towed vehicle.

As will be appreciated, the invention can be used with any type of towed vehicle having a tongue assembly with a pin-connected hitch. Thus, the invention can be used on wheeled trailers and carts, but also can be used for non-wheeled vehicles such as sleds and travois.

Accordingly, it is an object and advantage of the invention to provide an easily detachable handle for use with the tongue of a towed vehicle allowing the vehicle to be manually moved and maneuvered.

It is another object and advantage of the invention to provide a handle that can be used by a single person to manually move a towed vehicle using only one hand.

It is another object and advantage of the invention to provide a handle assembly that minimizes potential pinch points where portions of a person's body or clothing can become caught, thereby preventing injury and reducing the potential for damage to the user's clothing.

Usually, a pin-connection hitch consists of either a single member with an aperture or hole formed through it, or a clevis arrangement with holes formed through each branch of the clevis. The present invention encompasses embodiments directed toward accommodating either configuration.

In one embodiment, the tongue member is a hollow tube having an open end that forms a recess. The attachment portion of the handle is made in a size allowing it to be inserted into the recess. Holes or apertures formed through the tongue and the attachment portion of the handle are aligned and a pin is inserted through the holes to couple the handle to the tongue.

In another similar embodiment, the attachment portion of the handle has the recess, and is made to receive the end of the tongue. Again, holes or apertures formed through the tongue and the attachment portion of the handle are aligned and a pin is inserted through the holes to couple the handle to the tongue.

In another embodiment the tongue end and the attachment portion of the handle are disposed adjacent to each other. Once again, holes or apertures formed through the tongue and the attachment portion of the handle are aligned and a pin is inserted through the holes to couple the handle to the tongue.

In yet another embodiment, the tongue end has a clevis, with each of the clevis branches having a hole or aperture. The attachment portion of the handle also has a hole or aperture and is adapted to fit between the branches of the clevis. The attaching pin is inserted through the clevis holes and the hole in the attachment portion.

In yet another embodiment, the attachment portion of the handle has a clevis with holes through the clevis branches. The tongue end also has a hole and is adapted to fit between the clevis branches. Again, the attaching pin is inserted through the clevis holes and the hole in tongue end.

In yet another embodiment, both the attachment portion of the handle and the tongue end have a clevis, and the clevis branches have holes or apertures. The clevis at the attachment end of the handle can be adapted to fit between the clevis branches of the tongue or vice versa. In either configuration, the attaching pin is inserted through all the clevis holes, coupling the two parts together.

In a currently most preferred embodiment, both the attachment portion of the handle and the tongue end have a clevis. The tongue clevis is further provided with end walls that, in conjunction with the clevis branches, form a recess into which the handle clevis fits snugly. The end walls act to restrain the connection from pivoting about the attaching pin.

In any of the embodiments, the attaching pin can take a variety of forms. In one embodiment, a cylindrical pin is used is in conjunction with round holes or apertures in the attachment portion of the handle and the tongue. As will be appreciated by persons of ordinary skill in the art, however, any shape pin and corresponding apertures can be used. For example, a pin with a square cross-section could be used with corresponding square holes. Such an arrangement would have the attribute of restricting the rotation of the connection about the axis of the pin.

It is preferred that there be means provided for retaining the pin in place so as to prevent uncoupling of the connection at undesired times. In one preferred embodiment, the pin is provided with a head at one end larger than the holes through the handle and tongue. At the other end of the pin, a hole is provided that extends transversely through the pin. A cotter pin is inserted through the hole, and the pin is thereby retained in place by the head at one end and the cotter pin at the other. In another preferred embodiment, the pin is a common threaded hex-head bolt with a nut. A bolt is selected having a head larger than the handle and tongue holes. The bolt is inserted through the handle and tongue holes and the nut is installed, thereby retaining the pin in place.

It will also be appreciated that other alternative attaching pin arrangements are in the scope of the present invention, including arrangements of multiple pins. In one such alternative embodiment, the attachment portion of the handle and the tongue end each have a clevis. The tongue clevis is further provided with end walls that, in conjunction with the clevis branches, form a recess into which the handle clevis fits snugly. Aligning attachment holes are provided in each clevis branch, and an attachment pin is provided for each pair of holes to couple the handle to the tongue.

The attaching pins can take the form of threaded fasteners that can be threaded into threads formed in the holes. In an alternative arrangement, however, the pins can be disposed inside the handle portion and spring-loaded, with the ends of the pins projecting through the holes in the attachment portion of the handle. The handle and tongue can be coupled by compressing the pins into the handle, inserting the attachment portion of the handle into the tongue recess and aligning the handle attaching holes with the tongue attaching holes. Once in place, the pins can be released, allowing the pins to project through the holes, coupling the parts together.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

DETAILED DESCRIPTION OF THE INVENTION

Figure 1:
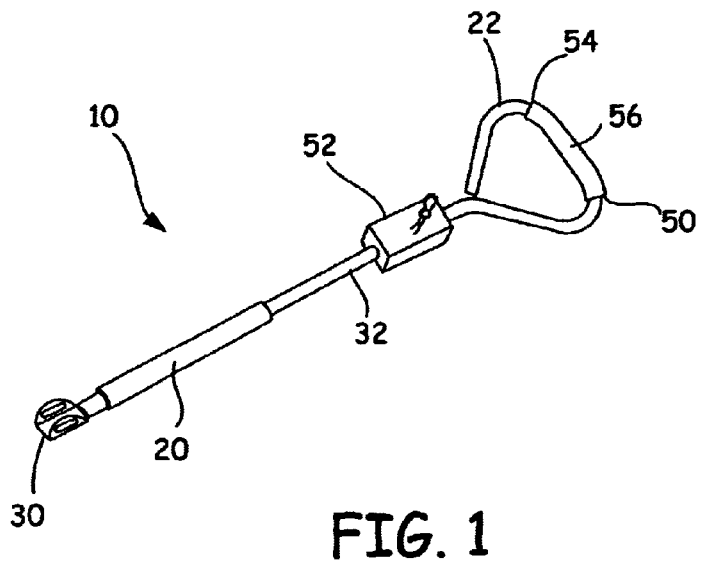
FIG. 1 is a perspective view of a removable handle and tongue assembly according to the present invention.

Referring first to FIGS. 1–4, there is shown generally the removable handle and tongue assembly 10 of the present invention. The removable handle and tongue assembly 10 includes a tongue portion 20 and a handle portion 22, which is capable of being retained in removable engagement with the tongue portion 20.

The removable handle and tongue assembly 10 permits the handle portion 22 to be easily attached to and detached from the tongue portion 20 while providing a strong connection between the handle portion 22 and the tongue portion 20. The removable handle and tongue assembly 10 thereby permits an object to be pulled manually with the handle portion 22 or pulled by attachment of the tongue portion 20 to a towing vehicle such as a tractor.

The removable handle and tongue assembly 10 also minimizes potential pinch points where portions of a person's body or clothing can become caught in the removable handle and tongue assembly 10 thereby preventing injury and reducing the potential for damage to the user's clothing.

The tongue portion 20 has a first end 30 and a second end 32. The first end 30 is adapted for removably attaching the tongue portion 20 to a utility cart, trailer or other towed vehicle (not shown). The second end 32 preferably has a clevis 34 that is defined by a pair of branches 36, as most clearly illustrated in FIG. 3. Between the branches 36 a recess 38 is defined. The branches 36 each have a clevis aperture 40 formed therein. The clevis apertures 40 are preferably co-axially aligned.

The handle portion 22 generally includes a gripping region 50 and an attachment region 52, as most clearly illustrated in FIG. 1. The gripping region 50 permits a person to hold on to handle portion 22. The gripping region 50 preferably has a loop configuration. A gripping area 54 on gripping region 50 is preferably substantially straight to facilitate holding handle portion 22 in a person's hand. To enhance the ability to hold handle portion 22, the gripping area 54 is preferably covered with a resilient foam material 56.

Figure 3:
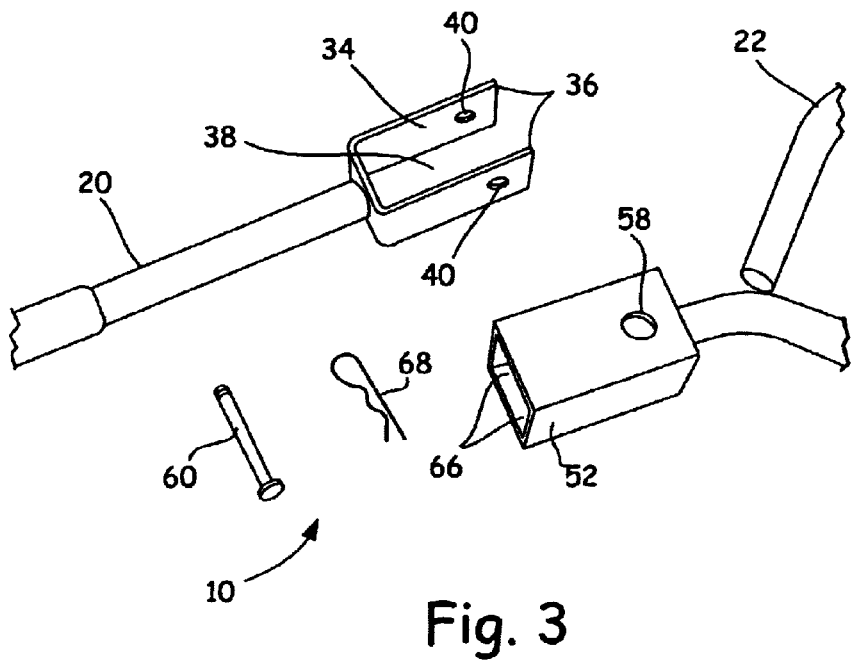
FIG. 3 is a perspective view of the removable handle and tongue assembly in an unassembled configuration.
Figure 4:
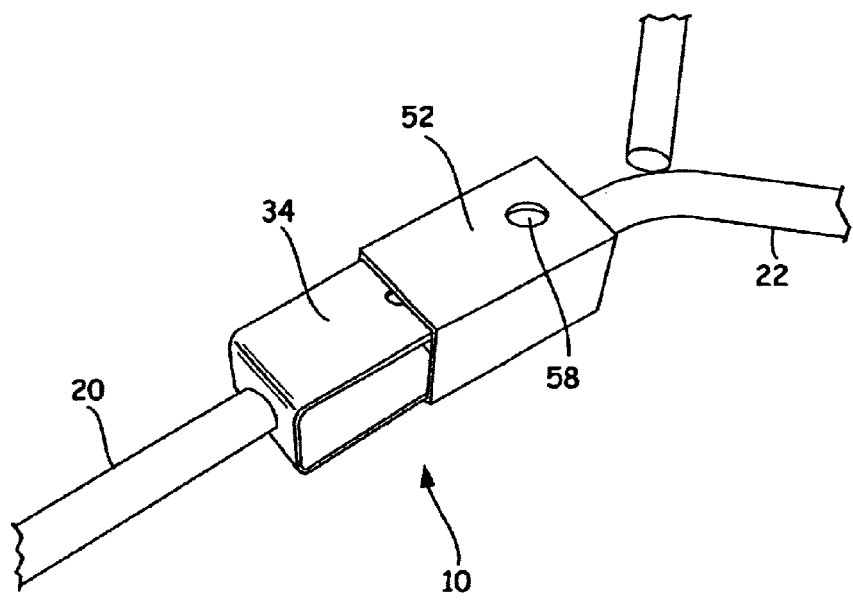
FIG. 4 is a perspective view of the removable handle and tongue assembly in a partially assembled configuration.

The attachment region 52 has two side walls 66 and two end walls 67 that define a substantially square recess 68, as most clearly illustrated in FIG. 3. The recess 68 is adapted to substantially receive the clevis 34, as illustrated in FIG. 4. The dimensions of the attachment region 52 preferably substantially conform to the dimensions of the clevis 34.

The attachment region 52 includes a pair of attaching apertures 58, which are preferably axially aligned. The attaching apertures 58 are aligned with the clevis apertures 40 when the tongue portion is inserted into the handle portion 22 so that an attaching pin 60 can be inserted therethrough to couple the handle portion 22 to the tongue portion 20.

Figure 2:
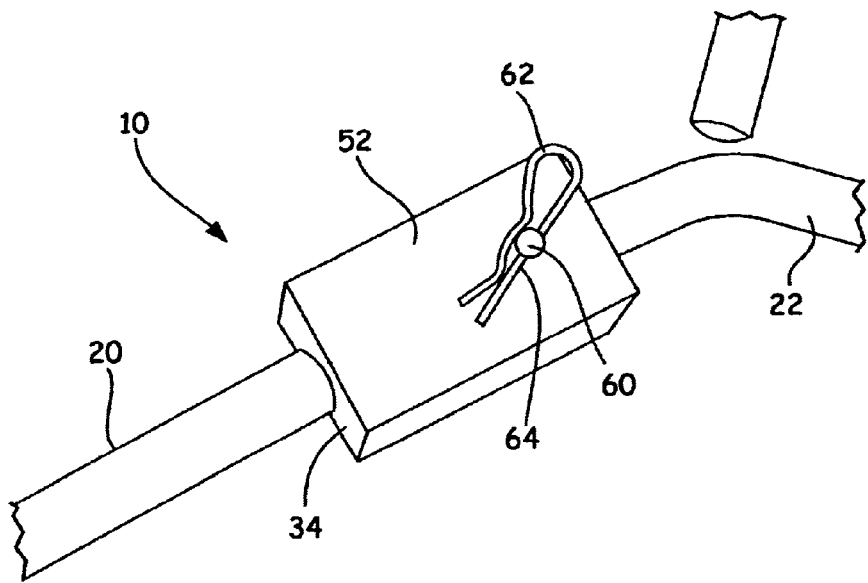
FIG. 2 is an enlarged perspective view of the removable handle and tongue assembly.

The attaching pin 60 has a first end 70 and a second end 72, as most clearly illustrated in FIG. 3. At the first end 70, a head 74 is provided that is larger than the attaching apertures 58 and the clevis apertures 40. At the second end 72 of the attaching pin 60, a cotter pin hole 64 is preferably provided extending through the attaching pin 60. When the attaching pin 60 is inserted through the clevis apertures 40 and the attaching apertures 58, it is retained in place by head 74 and cotter pin 62, which is inserted through cotter pin hole 64. The disposition of the cotter pin 62 when installed is best shown in FIG. 2.

Figure 5:
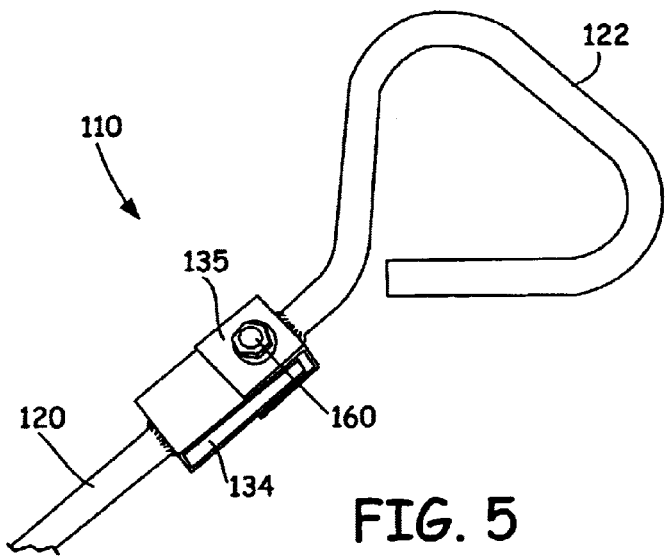
FIG. 5 is a perspective view of an alternative embodiment of the removable handle and tongue assembly.
Figure 6:
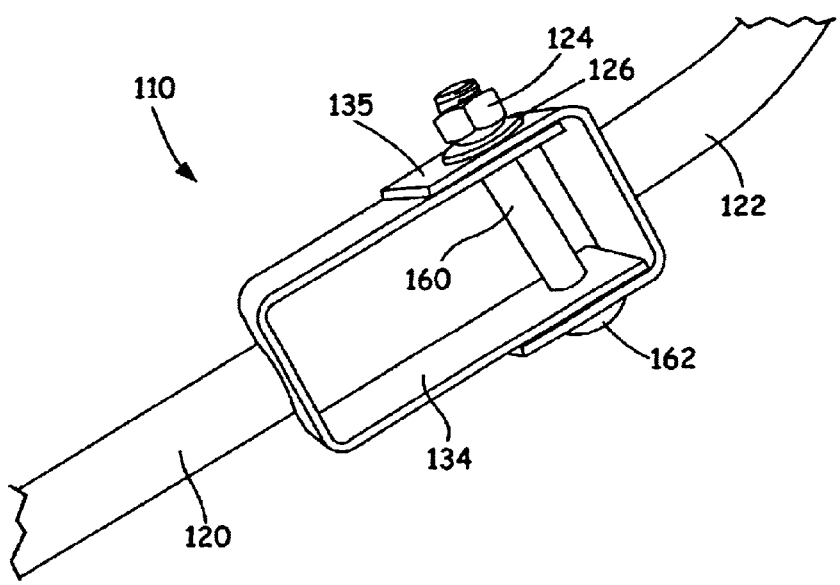
FIG. 6 is a side view of the removable handle and tongue assembly illustrated in FIG. 5.

In an alternative embodiment, removable the handle and tongue assembly 110 includes a tongue portion 120 and a handle portion 122, as illustrated in FIGS. 5–6. The attachment end 124 of the handle portion 122 is configured to receive the clevis 134, which is a part of the tongue portion 120.

The tongue portion 120 and the handle portion 122 are removably interconnected using an attaching pin 160. The attaching pin 160 used with this embodiment is preferably a threaded hex bolt, which is retained by a head 162 and a nut 164. Washers 166 may be used to provide better retention of the attaching pin 160.

While not illustrated in the drawings, it is possible to roll the edges of the side walls 135 around the margins of the clevis 134 to prevent the tongue portion 120 from pivoting with respect to the handle portion 122. Another method (also not illustrated) of preventing relative rotation of the handle portion 122 with respect to the tongue portion 120 would be to provide the attaching pin 160 with a square cross-section, fitting it into corresponding square shaped clevis apertures and attaching apertures.

Figure 7:
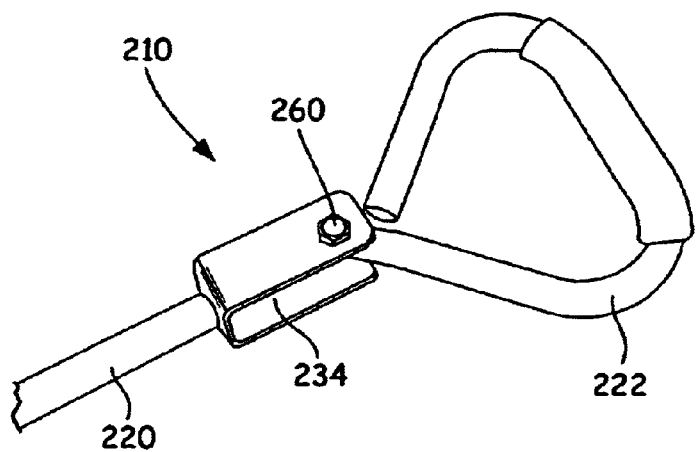
FIG. 7 is a perspective view of another alternative embodiment of the removable handle and tongue assembly.
Figure 8:
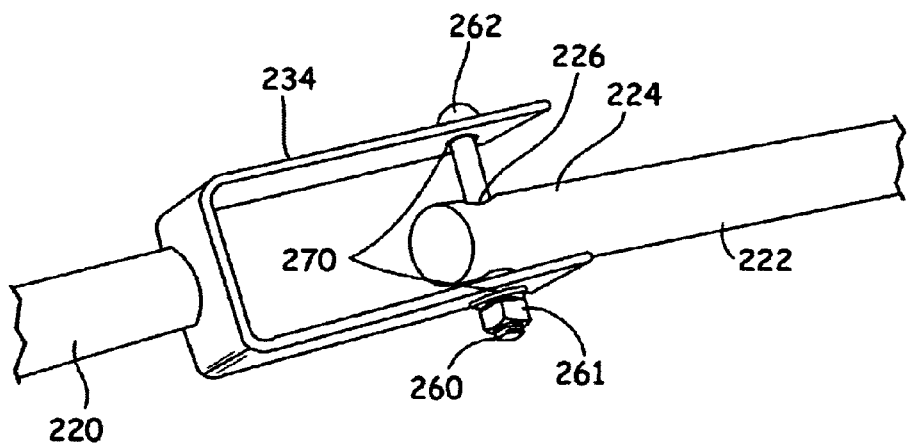
FIG. 8 is a side view of the removable handle and tongue assembly illustrated in FIG. 7.

In another alternative embodiment, the removable handle and tongue assembly 210 includes a tongue portion 220 and a handle portion 222, as illustrated in FIGS. 7–8. Similar to the other embodiments, the tongue portion 220 has a clevis 234. An attachment portion 224 of the handle portion 222 is attached to the clevis 234 using an attaching pin 260 inserted through the clevis apertures 236 and the attaching aperture 226. In this embodiment, the attaching pin 260 is preferably a threaded bolt having a head 262 and a nut 264. This embodiment permits the handle portion 222 to pivot laterally with respect to the tongue portion 220.

Figure 9:
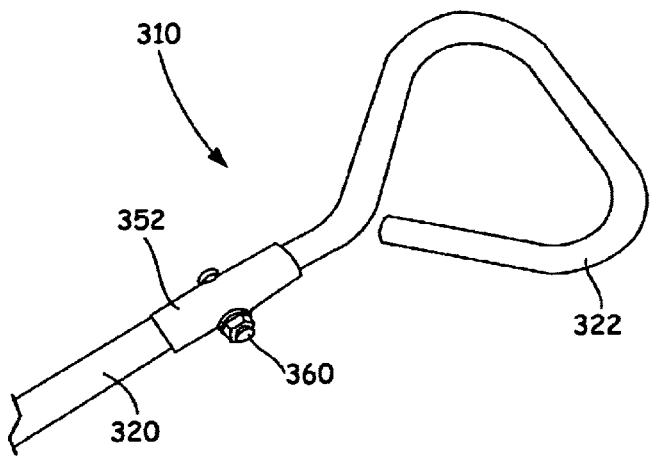
FIG. 9 is a perspective view of yet another alternative embodiment of the removable handle and tongue assembly in an assembled configuration.
Figure 10:
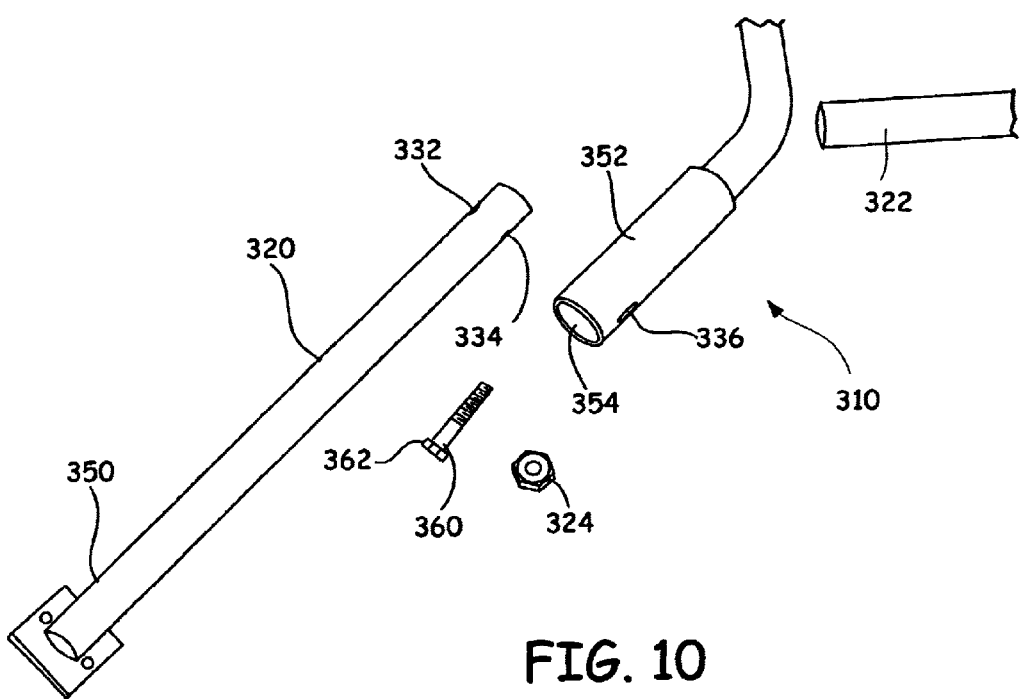
FIG. 10 is a perspective view of the embodiment of the removable handle and tongue assembly illustrated in FIG. 9 in an unassembled configuration.

In still another embodiment, the removable handle and tongue assembly 310 includes a tongue portion 320 and a handle portion 322, as illustrated in FIGS. 9–10. The tongue portion 320 has a first end 330 that is adapted to be attached to towed vehicle (not shown), and a second end 332, which has a substantially cylindrical shape. A person of ordinary skill in the art will appreciate that it is possible to adapt this embodiment for use with alternative shapes for the tongue second end 332, including for example, square, rectangular or hexagonal shapes.

The handle portion 322 includes an attachment portion 352 with a recess 354 that is adapted to receive the second end 332 of the tongue portion 320. The handle portion 322 is attached to the tongue portion 320 with an attaching pin 360 that is inserted through the first coupling aperture 334 and the second coupling aperture 336. The attaching pin 360 is preferably a threaded bolt that is retained in place by a head 362 and a nut 364.

Figure 11:
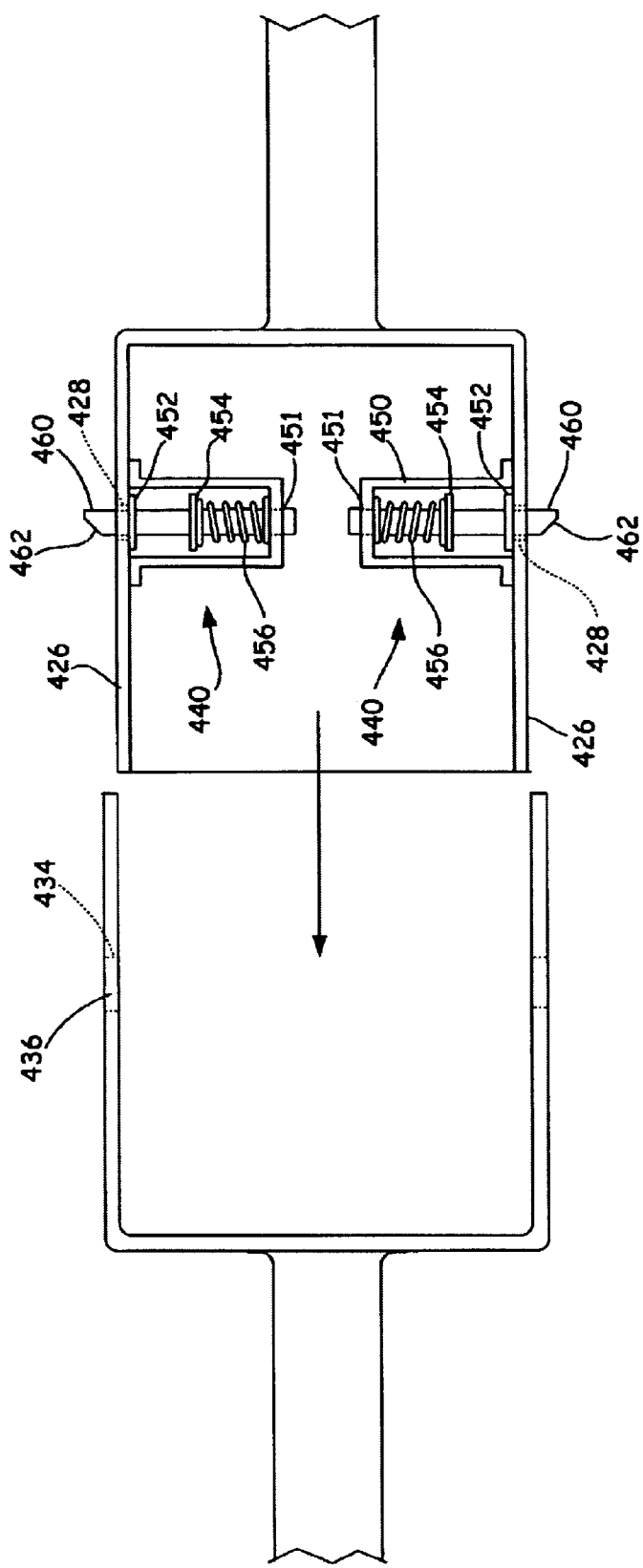
FIG. 11 is a cutaway view showing an embodiment of the invention having spring-loaded attaching pins.
Figure 12:
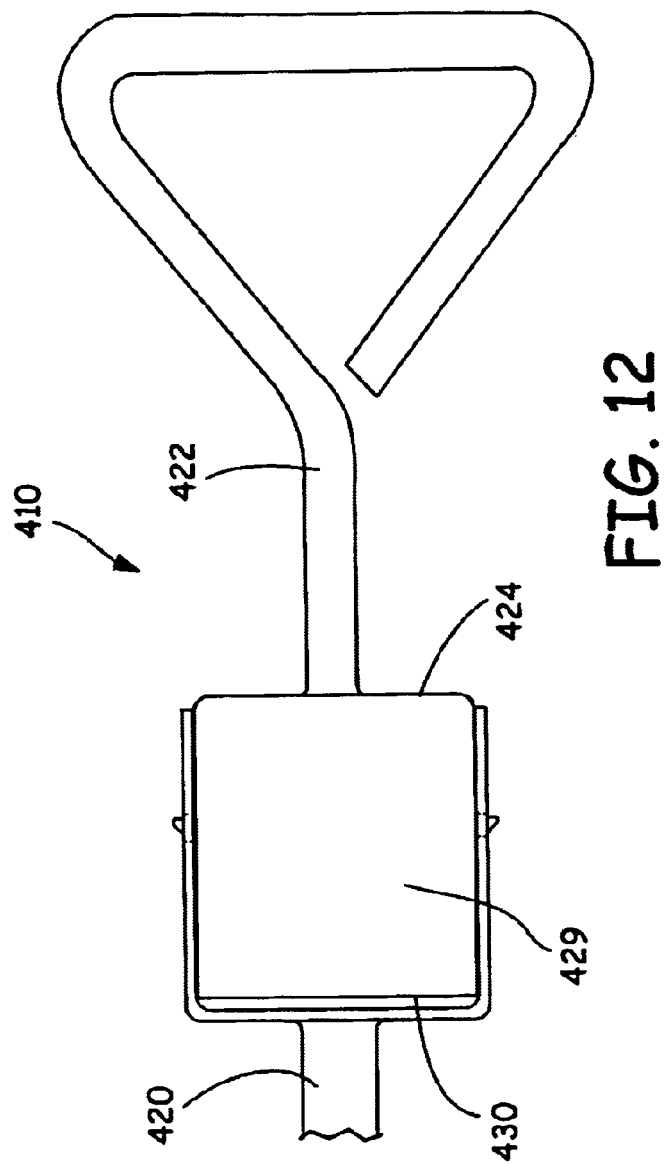
FIG. 12 is a perspective view of an embodiment of the invention having spring-loaded attaching pins in a coupled configuration.

As an alternative to using the bolt, which is described above, it is possible to use at least one spring-loaded attaching pins as illustrated in FIGS. 11–12. An attachment region 424 of the handle portion 422 preferably has two side walls 426 and two end walls 429 that define a substantially square profile. The side walls 426 each have an attachment aperture 428. Inside the attachment region and behind each attachment aperture 428 is mounted an attachment pin assembly 440.

The attachment pin assembly 440 consists of a bracket 450 that is attached to the side wall 426, and an attachment pin 460, which extends through a bracket pin hole 451 at one end and the attachment aperture 428 at its other end. A spring 456 is provided co-axial with the attachment pin 460 and is biased in compression against the bracket 450 and the spring retainer ring 454. A stop ring 452 is provided on the attachment pin 460 to provide a pre-determined stop for the attachment pin 460 and to prevent it from extending further than desired. Each attachment pin 460 preferably has a beveled end 462 to facilitate sliding attachment of the components.

To attach the handle portion 422 to the tongue portion 420, the attachment portion 424 is slidingly advanced into the clevis 434 with side walls 426 adjacent the clevis branches 434. As the attachment portion 424 is advanced, the attachment pins 460 are forced into the recess 430. When the attachment pins 460 reach the clevis apertures 436, the spring 456 forces the attaching pins 460 out and through the clevis apertures 436, until stopped by the stop ring 452.

The handle portion 422 is thus coupled to the tongue portion 420 with the attaching pins 460 that extend through the clevis apertures 436 and the attachment apertures 428. The handle portion 422 can be uncoupled from the tongue portion 420 by pressing the attaching pins 460 inward and withdrawing the handle portion 422 from the clevis 434.

It is contemplated that features disclosed in this application, as well as those described in the above applications incorporated by reference, can be mixed and matched to suit particular circumstances. Various other modifications and changes will be apparent to those of ordinary skill.

What is claimed is:

1. A handle and tongue assembly comprising:

a tongue portion having a first end and a second end, wherein the first end is adapted for attachment to a towed vehicle, wherein the second end consists of a clevis with a pair of legs extending therefrom, wherein each of the clevis legs have a clevis aperture formed therein;

a handle portion having an attachment region and a gripping region in a substantially transverse alignment to the handle portion, wherein the attachment region has a first pair of legs and a second pair of legs, and wherein the first pair of legs extend between the second pair of legs to define a recess that is adapted to at least partially receive the clevis, wherein the first pair of legs each have an attaching aperture formed therein; and an attachment means that engages the pair of clevis legs through at least one of the clevis apertures and the first pair of attachment region legs through at least one of the attaching apertures to attach the handle portion to the tongue portion.

2. The handle and tongue assembly of claim 1, wherein the attachment means is a bolt.

3. The handle and tongue assembly of claim 1, wherein the handle portion is retained in a stationary orientation with respect to the tongue portion when the handle portion is attached to the tongue portion.

4. A handle and tongue assembly comprising:

a tongue portion having a first end and a second end, wherein the first end is adapted for attachment to a towed vehicle, wherein the second end has a clevis, wherein the clevis consists of a pair of clevis legs, wherein each of the clevis legs has a clevis aperture;

a handle portion having an attachment region and a gripping region in a substantially transverse alignment to the handle portion, wherein the attachment region has a first pair of attachment region legs and a second pair of attachment region legs, wherein the first pair of attachment region legs extend between the second pair of attachment region legs to define a recess that is adapted to at least partially receive the pair of clevis legs, and wherein the first pair of attachment region legs each have an attachment aperture formed therein; and attachment means that engages the tongue portion through the clevis apertures and the handle portion through the attachment aperture so that the towed vehicle is movable by manually grasping the gripping region.

5. The handle and tongue assembly of claim 4, wherein the attachment means comprises an attaching pin that engages the clevis and the attachment region for removably attaching the handle portion to the tongue portion.

6. The handle and tongue assembly of claim 4, wherein the handle portion is retained in a stationary orientation with respect to the tongue portion when the handle portion is attached to the tongue portion.

7. A handle and tongue assembly for manually moving and positioning a trailer, the handle and tongue assembly comprising:

an elongated tongue member having a first end and a second end, wherein the first end is operably attachable to the trailer, and wherein the second end has a clevis, wherein the clevis consists of a pair of clevis branches, each branch of the clevis having a clevis aperture formed therethrough, the clevis apertures being substantially co-axially aligned;

a handle portion having an attachment portion and a gripping portion in a substantially transverse alignment to the handle portion, the attachment portion comprising a first pair of side walls and a second pair of side walls, wherein the first pair of side walls are substantially parallel, wherein the second pair of side walls are substantially parallel, wherein the first pair of side walls are substantially perpendicular to the second pair of side walls, wherein the first pair of side walls are spaced apart at predetermined distance to form a recess therebetween, wherein the recess is adapted to receive at least a portion of the clevis, wherein each of the first pair of side walls has an attaching aperture formed therethrough, wherein the attaching apertures are disposed so as to be substantially co-axially alignable with the clevis apertures when the tongue portion and the handle portion are mated together, wherein the gripping portion is adapted so as to be grippable by a user; and an attaching pin adapted to be insertable through the clevis apertures and attaching apertures to attach the handle portion to the tongue portion.

8. The handle and tongue assembly of claim 7, wherein the attaching pin has a first end and a second end, the first end having a head, the head-being of a predetermined size larger than the clevis apertures and the attaching apertures;

wherein the attaching pin has a cotter pin hole formed therethrough, the cotter pin hole being disposed near the second end, an axis of the cotter pin hole being substantially orthogonal to a longitudinal axis of the pin; and further comprising a cotter pin, a branch of the cotter pin being insertable in the cotter pin hole, whereby the attaching pin can be temporarily secured in place.

9. A method of towing a vehicle using a multi-purpose handle and tongue assembly, the method comprising:

operably attaching a tongue portion to a towed vehicle, wherein the tongue portion has a pair of clevis legs extending therefrom opposite the towed vehicle, and wherein each of the clevis legs has a clevis aperture formed therein;

attaching the tongue portion to a towing vehicle by extending an attaching pin through the clevis apertures so that the attaching pin engages the towing vehicle;

pulling the towed vehicle with the towing vehicle;

detaching the towed vehicle from the towing vehicle by removing the attaching pin from the clevis aperture;

extending the clevis legs at least partially into a recess on an attachment region on a handle portion, wherein the attachment region has a first pair of legs and a second pair of legs, wherein the first pair of legs extend between the second pair of legs define the recess, and wherein the first pair of legs each have an attaching aperture formed therein;

attaching the handle portion to the tongue portion by extending the attaching pin through the clevis apertures and the attaching apertures; and pulling the towed vehicle using a gripping region on the handle portion.

10. The method of claim 9, and further comprising forming the gripping region with a loop configuration having a handle aperture extending therethrough.

11. The method of claim 10, and further comprising forming a gripping area on the gripping region to facilitate holding the handle portion in a person's hand.

12. The method of claim 11, and further comprising covering the gripping area with a resilient foam material.

* * * * *